United States Patent

[11] 3,543,647

| [72] | Inventors | Daniel Luce Hall<br>Waterloo;<br>Stanley Martin Gregerson, Cedar Falls,<br>Iowa |
|---|---|---|
| [21] | Appl. No. | 821,349 |
| [22] | Filed | May 2, 1969 |
| [45] | Patented | Dec. 1, 1970 |
| [73] | Assignee | Deere & Company<br>Moline, Illinois<br>a corporation of Delaware |

[54] CONTROL VALVE MEANS FOR A TWO-WAY HYDRAULIC CYLINDER
3 Claims, 3 Drawing Figs.

[52] U.S. Cl. .................................................. 91/420,
91/449
[51] Int. Cl. ..................................................... F15b 11/08
[50] Field of Search........................................... 91/420,
449, 357, 402, 409, 449; 92/75, 86, 163

[56] References Cited
UNITED STATES PATENTS
3,293,994 12/1966 Napolitano.................. 92/80X

*Primary Examiner*—Martin P. Schwadron
*Assistant Examiner*—A. Ostrager
*Attorneys*—H. Vincent Harsha, Harold M. Knoth, William A. Murray, John M. Nolan and Jimmie R. Oaks

ABSTRACT: A control valve for controlling a two-way hydraulic cylinder in which a pressure-compensated flow control valve maintains a constant predetermined flow rate to the cylinder, and including a pair of check valves normally preventing return flow from the ends of the cylinder, a pair of opposed hydraulically-operated pistons for controlling the check valves and a manually-operated spool-type direction control valve for selectively connecting the outlets of the pressure-compensated valve to the ends of the cylinder and to the pistons.

Patented Dec. 1, 1970
3,543,647
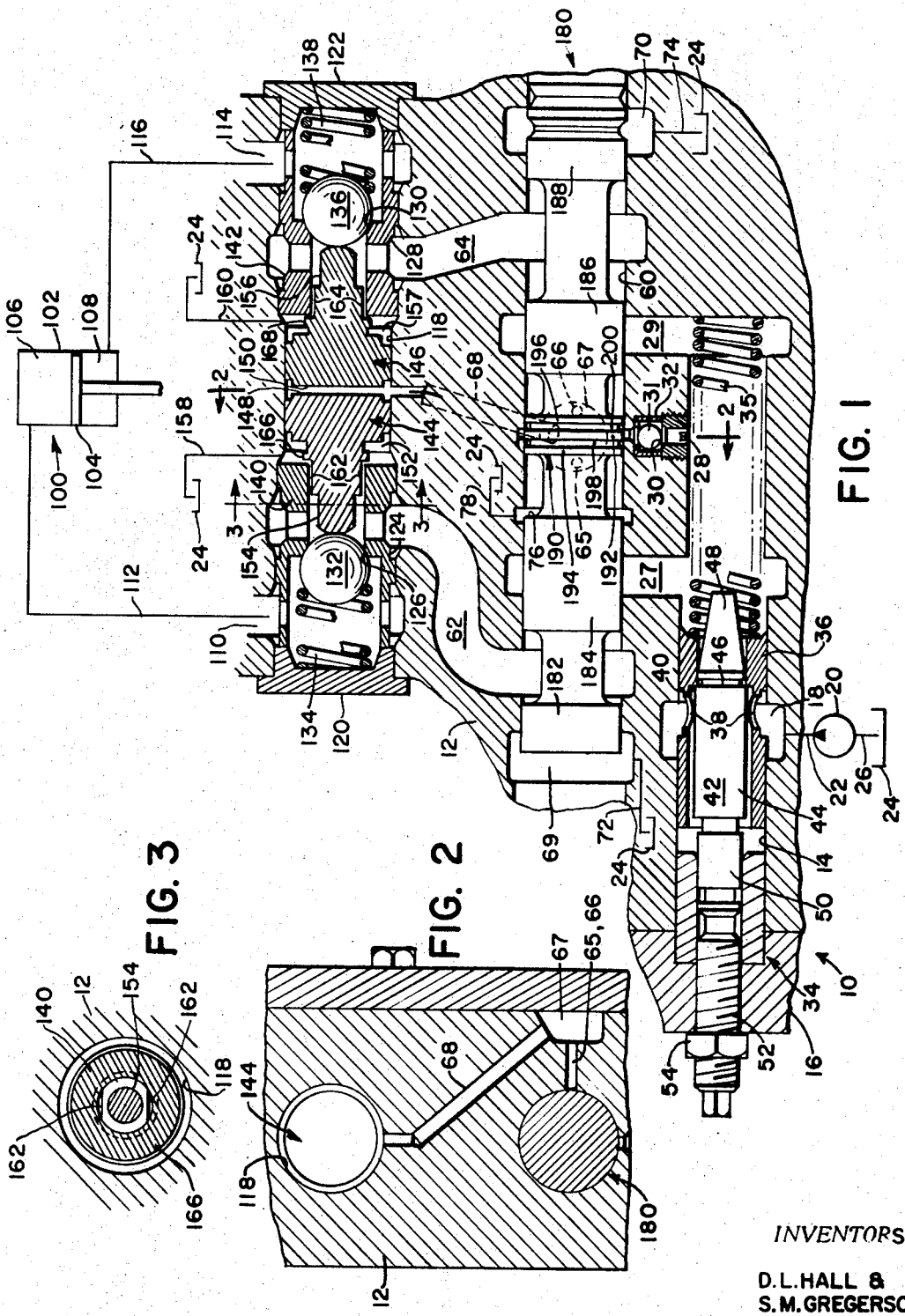
INVENTORS
D. L. HALL &
S. M. GREGERSON 3,543,647

1

CONTROL VALVE MEANS FOR A TWO-WAY HYDRAULIC CYLINDER

BACKGROUND OF THE INVENTION

This invention relates to an improved valve means for controlling a reversible pressure-actuated motor and more specifically relates to an improvement over the subject matter of U.S. Pat. No. 3,274,902 granted to Richard M. Kleckner on 27 Sept. 1966.

The known uses of spool-type direction control valves to operate two-way hydraulic cylinders entails the problem of leakage of the valve lands which causes the cylinder to creep or settle.

The above-noted Kleckner design partially overcomes this problem by the use of check valves but still has the problem that leakage from the pressure source occurs across the lands and causes opening of the check valves before the pressure to the cylinder is sufficient to operate the cylinder, and the cylinder then settles until the operating pressure becomes sufficient. This problem occurs because the circuit for pressurizing the hydraulically operated piston means for unseating the check valves is interconnected with the work passages leading to the opposite ends of the cylinder.

SUMMARY OF THE INVENTION

The present invention provides an improved pilot-operated check valve assembly for use in a hydraulic system for controlling a two-way hydraulic cylinder and more specifically, features a check valve assembly which bleeds off high pressure leakage from a spool-type direction control valve to the reservoir so that the leakage does not affect the operation of the hydraulic cylinder.

A further object is to provide, for operating the check valve unseating means, a pressure supply passage separate from the passages for supplying fluid to the opposite ends of the cylinder and containing a check valve for preventing the return of flow from the unseating means.

Another object is to provide a pair of opposed pistons stepped down in diameter from their faces so that they will move to positively unseat the check valves.

Still a further object is to provide the pistons with shafts having flats cooperating with a pair of cylindrical members for joining the work passages to the reservoir when the supply passage for the operation of the pistons is connected to the reservoir and to provide shoulders on the pistons cooperating with the cylindrical members for preventing flow along the flats on the pistons when the supply passage is pressurized and the piston faces are separated.

These and other objects will become apparent from the following detailed description and accompanying drawings.

BRIEF DESCRIPTION OF THE DRAWINGS

FIG. 1 is a combined sectional and schematic view of the hydraulic system in a neutral condition.

FIG. 2 is a section taken along line 2-2 of FIG. 1.

FIG. 3 is a section taken along line 3-3 of FIG. 1.

DESCRIPTION OF THE PREFERRED EMBODIMENT

The system includes a control valve assembly, indicated in its entirety by the numeral 10, having a valve body 12 provided with a cylindrical bore 14 that is closed at its left end at 16. The bore 14 has an inlet port 18 connected to a source of fluid under pressure 20 via a conduit 22, fluid being supplied to the pressure source 20 from a reservoir 24 via a conduit 26. The bore 14 has three supply passages 27, 28 and 29. A valve seat 30 in the passage 28 is controlled by a spherical check valve 31 in a retainer cage 32 and allows flow only from the bore 14.

A pressure-compensated flow valve 34 in the bore 14 maintains a constant preselected flow among the inlet port 18 and the outlet ports 27, 28 and 29. The valve 34 includes a compression spring 35 which acts between one end of the bore 14 and a tubular or sleevelike regulating valve 36. The regulating valve extends across the inlet 18 and contains a plurality of radial metering ports 38 positioned to receive flow from the inlet 18, and the regulating valve has an interior annular shoulder 40 located slightly downstream from the ports 38.

A flow control valve member 42 concentrically positioned within the valve member 36 includes a cylindrical portion 44 which terminates in an annular shoulder 46 opposed to and forming a seat for the shoulder 40 of the regulating valve 36. A tapered end portion 48 extends from the shoulder 46 and a stem 50 having a threaded portion 52 extends through the member 16 from the left of the cylindrical portion 44 to provide means for adjusting the flow control valve 42, being held in adjusted position by a lock nut 54.

A bore 60 intersects the supply ports 27, 28 and 29, as well as a pair of work passages 62 and 64 and a pair of small passages 65 and 66 adjacent to and on opposite sides of the inlet passage 28 and opening into a cavity 67 which is in turn connected to a passage 68. A pair of passages 69 and 70 respectively at the left- and right-hand ends of the bore 60 lead to the reservoir 24 via conduits 72 and 74. A further passage 76 to the left of the inlet passage 28 is connected to the reservoir at 78.

A reversible hydraulic motor 100, here shown as a double-acting hydraulic cylinder or ram, includes a cylinder 102 and a piston 104 movable between opposite cylinder ends 106 and 108 that are connected respectively to first and second motor passages 110 and 114 by conduits 112 and 116.

The motor outlet passages 110 and 114 are intersected by a cylindrical bore 118 in the body 12 and closed at opposite ends by caps 120 and 122 respectively. The work passages 62 and 64 intersect the bore 118 adjacent to the respective motor passages 110 and 114. A first valve seat 124 having an axial opening 126 is mounted in the bore 118 between the first motor outlet passage 110 and the work passage 62, and a second valve seat 128 having an axial opening 130 is mounted in the bore 118 between the second motor outlet passage 114 and the work passage 64. The first motor outlet passage 110, the work passage 62 and the seat 124 form a first passage means for conduit means through the body 12 closable by a spherical check valve 132 biased against the valve seat 124 over the opening 126 by a spring 134 for preventing the return of fluid from the motor outlet passage 110 to the work passage 62. Similarly, the second motor outlet passage 114, the work passage 64 and the valve seat 128 form a second passage closable by a check valve 136 biased against the valve seat 128 over the opening 130 by a spring 138 for preventing the return of fluid from the second motor outlet passage 114 to the work passage 64.

The bore 118 carries a pair of centrally bored cylindrical members 140 and 142 adjacent to the passages 62 and 64 respectively. A pair of pistons 144 and 146 are slidable in the bore 118 between the check valves 132 and 136, the pistons having opposite faces 148 and 150 exposed to the passage 68. The pistons have axial shaft portions 154 and 156 which are reduced in diameter from the faces 148 and 150 and which extend through the cylindrical members 140 and 142 respectively. A pair of chambers 152 and 157 between the pistons 144 and 146 and the cylindrical members 140 and 142 respectively are connected to the fluid reservoir 24 by means of conduits 158 and 160. The shaft portions 154 and 156 respectively have axial flats 162 and 164 for allowing fluid to flow from the work passages 62 and 64 into the chambers 152 and 157 when the pistons are in the position illustrated, and further have annular shoulders 166 and 168 on the shaft portions 154 and 156 that move against the cylindrical members 140 and 142 to prevent fluid flow along the flats when the pistons are separated from the position illustrated. Such a separated position would be obtained and the axial shaft portions 154 and 156 of the pistons would respectively engage and unseat the check valves 132 and 136 upon pressure rise between the piston faces 148 and 150 sufficient to overcome the fluid pressure and spring forces on the check valves.

A manually-actuated direction control valve 180 is shiftable in the bore 60 for selectively connecting the work passages 62 and 64 to the supply passages 27 and 29 respectively or to the reservoir passages 69 and 70 respectively. The control valve 180 also selectively connects the passages 65 and 66 and the associated cavity 67 and passage 68 to the supply passage 28 or to the reservoir connected passage 76 and has lands 182 and 184 at the left-hand end on opposite sides of the work passage 62, the land 184 blocking the supply passage 27, and lands 186 and 188 at the right-hand end on opposite sides of the work passage 64, the land 186 blocking the supply passage 29. The control valve 180 has a land 190 intermediate its ends which has a first relatively narrow land portion 192 centered over, but not blocking, the inlet of supply passage 28 and second and third relatively narrow land portions 194 and 196 respectively between the supply passage 28 and the passages 65 and 66. The land 190 has a pair of annular grooves 198 and 200 separating the land portions 192, 194 and 196.

In operation: The regulating valve member 36 will be to the right of the position illustrated and flow will be permitted through the opening defined between the shoulder 40 and the tapered end 48 to the supply passages 27, 28 and 29. The control valve 180 in its neutral position blocks the supply conduits 27, 28 and 29 and the passage 68 is connected to the reservoir at 76 via the cavity 67 and the passage 65. Since there is no pressure in the passage 68, the pistons 144, 146 will assume the position illustrated and permit fluid under pressure in the work passages 62 and 64 to flow through the axial flats 162 and 164 into the chambers 152 and 157 and from there to the fluid reservoir through the conduits 158 and 160. The connection of the work passages 62 and 64 to the reservoir when the control valve is in the neutral position is important, since any high pressure leakage which might occur between the supply passages 27 and 29 and the associated work passages 62 and 64 across the respective lands 184 and 186 will be directed to the reservoir instead of causing the check valves to open and cause unwanted operation or creeping of the piston 104.

When the control valve 180 is moved to the left from the neutral position illustrated, the supply passage 27 remains blocked, the work passage 62 is connected to the reservoir via passages 69 and 72, the work passage 64 is connected to the supply passage 29 and the supply passage 28 is connected to the passage 68 via the passage 66 and the cavity 67, the flow into the passage 28 unseating the check valve 31. Since the passage 68 is pressurized, the pistons 144 and 146 will separate and the shaft portions 154 and 156 of the pistons will positively unseat the check valves 132 and 136 respectively and, at the same time, the shoulders 166 and 168 will seat against cylindrical members 140 and 142 and block flow from occurring along the flats 162 and 164. With the check valves 132 and 136 open, exhaust of the fluid from the end 106 of the cylinder 102 will occur via passages 112, 110, opening 126 and work passage 62, and fluid under pressure from passage 64 will enter the bottom end 108 of the cylinder via opening 130 and passages 114 and 116. When the pistons 144 and 146 are separated and the check valves 132 and 136 are open as described above, flow of fluid into the supply passage 28 ceases and the check valve 31 will reseat and prevent escape of fluid from between the piston faces 148 and 150 until the control valve 180 is again shifted to neutral. Since the pressure in the passage 68 is unaffected by pressure drops in the supply passage 64 once the check valve 31 seats, the pistons will keep the check valves 132 and 136 open regardless of pressure fluctuations or load reversals in the system, thus preventing chattering or intermittent seating and unseating of the check valve.

It will be appreciated that when the control valve 180 is shifted to the right from neutral, a similar condition is obtained. The supply passage 27 is connected to the work passage 62 and the work passage 64 is connected to the reservoir via passages 70 and 74. The land 186 opens the supply passage 29; however, the space between the lands 194 and 196 prevents further flow. The flow from the supply passage 28 unseats the valve 31 and enters the space between the piston faces 148 and 150 via the passage 65, the cavity 67 and passage 68. The pressure between the piston faces 148 and 150 again causes the pistons to separate and open the check valves 132 and 136 and simultaneously flow along the flats 162 and 164 is blocked and the top end 106 of the cylinder is pressurized while the bottom end 108 is exhausted.

By moving the control valve 180 to its extreme right position, a "float" condition of the system is obtained wherein the work passages 62 and 64 are connected to the reservoir respectively via the passages 69 and 72 and the passages 70 and 74. The flow from the supply passages 27 and 29 is blocked between the respective lands 182 and 184 and lands 186 and 196. The supply passage 28 is connected to the space between the piston faces 148 and 150 via the passages 65, the cavity 67 and the passage 68, and the pressure between the faces 148 and 150 separates the pistons to unseat the check valves 132 and 136 and simultaneously block flow from the axial flats 162 and 164, and the opposite ends of the motor 100 are thus connected to the reservoir-connected work passages 62 and 64.

We claim:

1. A hydraulic system adapted for connection between a source of fluid pressure having an associated reservoir and a reversible hydraulic motor having alternate inlets, comprising: first and second conduit means respectively communicating with said alternate inlets; a third conduit means; control valve means operably connected to the pressure source, reservoir and first, second and third conduit means for establishing, selectively, a neutral condition wherein all three conduit means are connected to the reservoir, a first active condition wherein the first and third conduit means are connected to the source and the second conduit means is connected to the reservoir, and a second active condition wherein the second and third conduit means are connected to the source and the first conduit means is connected to the reservoir; first and second check valves respectively mounted in the first and second conduit means between the control valve means and the motor and biased against the return of fluid from the motor; means including a bore between the check valves and joining the first and second conduit means; a pair of opposed pistons in said bore actuated by fluid pressure in the bore to engage and unseat the check valves, said third conduit means being connected to the bore between the pistons; a pair of members in the bore between the respective check valves and pistons and each member having an opening for receiving a respective piston portion; a reservoir-connected passage means adjacent said member, and the piston portions and the respective members having cooperating means for allowing flow from said first and second conduit means to said reservoir-connected passage means when said control valve means is in its neutral condition and for interrupting flow from the first and second conduit means to said reservoir-connected passage means when said control valve means is in an active condition.

2. The invention defined in claim 1, wherein the piston portions are spaced from the openings in the members to form fluid passages between the first and second conduit means and said reservoir-connected passage means and the cooperating means includes complementary engageable surfaces on the piston portions and members.

3. The invention defined in claim 1, wherein the piston portions are generally cylindrical and reduced in diameter and wherein said members have openings for slidably receiving said shaft portions, said shaft portions having axial flats defining fluid passages through the openings in the respective members, an annular shoulder means formed on said shaft portion inwardly of the flat for tightly abutting said members and closing fluid passages when the pistons move outwardly to unseat the check valves.